United States Patent [19]
O'Loughlin

[11] Patent Number: 5,221,107
[45] Date of Patent: Jun. 22, 1993

[54] PREFILTER ASSEMBLY
[75] Inventor: John P. O'Loughlin, Mesa, Ariz.
[73] Assignee: TRW Inc., Lyndhurst, Ohio
[21] Appl. No.: 629,443
[22] Filed: Dec. 18, 1990
[51] Int. Cl.[5] ............................................ B60R 21/16
[52] U.S. Cl. .................................... 280/728; 280/736; 55/490
[58] Field of Search .............. 280/743, 741, 740, 736, 280/728, 731, 737, 742, 729; 55/490, 502, 526, DIG. 43

[56] References Cited
U.S. PATENT DOCUMENTS

| | | | |
|---|---|---|---|
| 3,690,606 | 9/1972 | Pall | 55/526 |
| 3,985,076 | 10/1976 | Schneiter | 102/39 |
| 4,278,455 | 7/1981 | Nardi | 55/502 |
| 4,437,681 | 3/1984 | Adams et al. | 280/733 |
| 4,632,682 | 12/1986 | Erdmannsdorfer | 55/502 |
| 4,902,036 | 2/1990 | Zander et al. | 280/736 |
| 5,064,459 | 11/1991 | Unterforsthuber et al. | 280/736 |

OTHER PUBLICATIONS

Metex Bulletin TPD-O, Johnson Industrial Sales, Inc. 3 pages.

Primary Examiner—Margaret A. Focarino
Assistant Examiner—Paul Dickson
Attorney, Agent, or Firm—Tarolli, Sundheim & Covell

[57] ABSTRACT

An apparatus for inflating a vehicle occupant restraint such as an airbag includes a housing. A canister including a lower section and a cover is located in the housing. Gas generating material is located within the canister. The gas generating material, when ignited, generates gas for inflating the air bag. An annular prefilter is disposed within the canister, radially outward of the gas generating material and radially inward of the side wall of the canister. The prefilter is resiliently deformed axially between the canister cover and the canister lower section to hold the prefilter in place in the canister.

10 Claims, 3 Drawing Sheets

PREFILTER ASSEMBLY

BACKGROUND OF THE INVENTION

1. Technical Field

The present invention relates to a gas generating device, and particularly to an inflator for inflating an air bag to protect an occupant of a vehicle.

2. Description of the Prior Art

It is well known to protect a vehicle occupant by using an air bag that is inflated when the vehicle encounters sudden deceleration, such as in a collision. The air bag restrains movement of the vehicle occupant during the collision. The air bag is typically inflated by gas generated by activation of gas generating material. The gas generating material is contained in an air bag inflator.

The gas generated by the gas generating material is commonly passed through one or more filters before it enters the air bag. The filters remove combustion products and particulate matter from the gas, and also cool the gas. It is known to include one filter, along with the gas generating material, in a separate metal container within the inflator. The filter is commonly and henceforth referred to as a prefilter. The current state of the art prefilter is typically made from a strip cut from a sheet of woven wire mesh cloth. The strip is formed into an annular ring. The annular ring shape of the wire mesh is maintained by welding the strip at one or more overlapping regions of the wire mesh, or by forming the ring within a propellant chamber which maintains the annular ring shape of the wire mesh. To prevent the welded annular prefilter from rattling in the canister, the welded annular prefilter is formed into an oval shape. The oval shaped prefilter radially contacts the propellant canister side wall, thus preventing the woven wire mesh welded prefilter from rattling.

SUMMARY OF THE INVENTION

The present invention is an apparatus for inflating a vehicle occupant restraint. The apparatus includes a housing and a canister located in the housing. The canister has first and second opposed axially inwardly facing surfaces. Gas generating material is located within the canister. When ignited, the gas generating material generates gas for inflating the vehicle occupant restraint. A prefilter is located in the canister for filtering and cooling the gas generated by the gas generating material. The prefilter is compressed between the first and second opposed axially inwardly facing surfaces of the canister, to hold the prefilter in place in the canister.

In a preferred embodiment, the prefilter is an annular knitted stainless steel structure of one or more randomly oriented stainless steel wires. The entire surface of the knitted stainless steel structure is defined by longitudinal surfaces of the wires. Thus, the preferred embodiment minimizes the number of sharp edges or points on the surface of the prefilter.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT OF THE INVENTION

Figure 1:
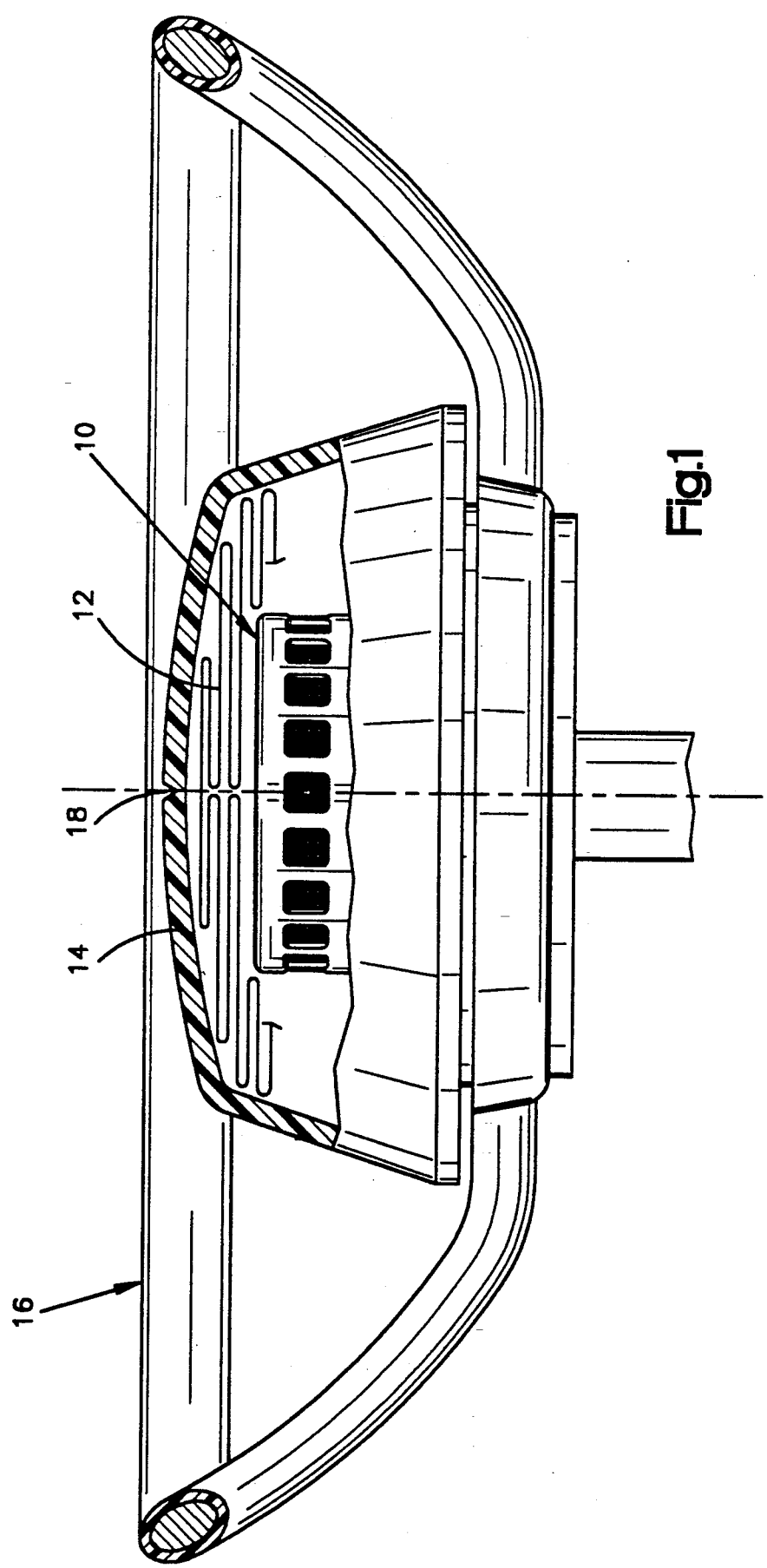
FIG. 1 is a transverse view, partially in section, of a vehicle steering wheel with an inflatable occupant restraint module incorporating an inflator constructed in accordance with the present invention.

The present invention relates to an air bag inflator and particularly to an inflator for inflating an air bag to protect the driver of a vehicle. The present invention is applicable to various inflator constructions. As representative of the present invention, FIG. 1 illustrates an inflator 10. An air bag 12 is folded around the inflator 10. A cover 14 encloses the air bag 12 and the inflator 10. The inflator 10, the air bag 12, and the cover 14 are components of a module which is mounted on a vehicle steering wheel 16.

Upon the occurrence of sudden vehicle deceleration, such as occurs in a collision, the inflator 10 is energized and produces a large volume of gas. The gas from the inflator 10 expands the air bag 12. As the air bag 12 starts to expand, it breaks weakened portions in the cover 14. One of the weakened portions is designated 18 in FIG. 1. As the air bag 12 continues to expand, it moves into the space between the driver of the vehicle and the steering wheel 16 to restrain movement of the driver, as is known.

Figure 2:
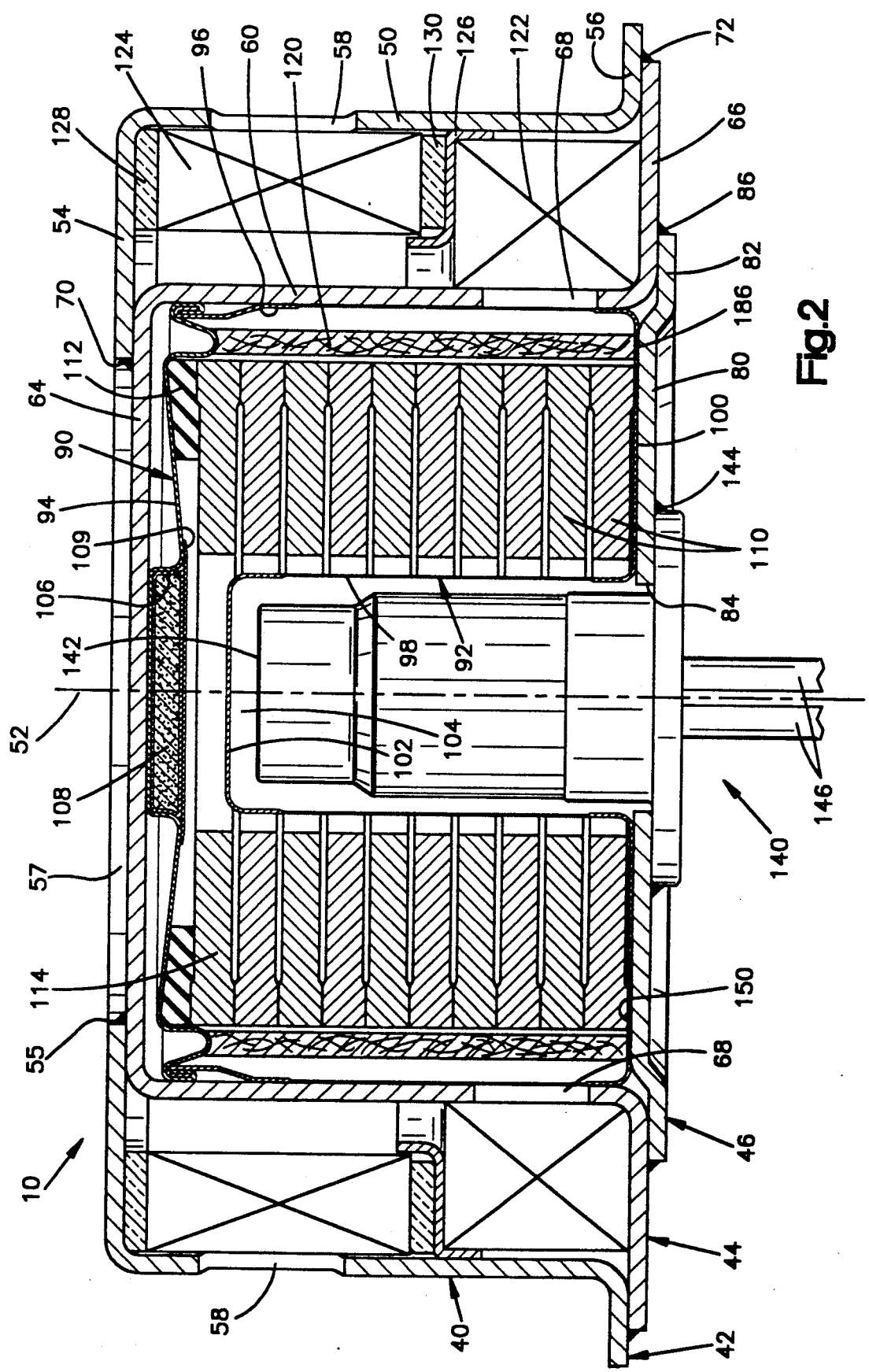
FIG. 2 is a transverse view, partially in section, of the inflator of FIG. 1.

The inflator 10 (FIG. 2) includes a housing 40. The housing 40 is made of three pieces, namely a diffuser cup 42, a combustion cup 44, and a combustion chamber cover 46. The diffuser cup 42, the combustion cup 44, and the combustion chamber cover 46 are made of a metal, such as UNS S30100 stainless steel.

The diffuser cup 42 is generally cup-shaped and has a cylindrical side wall 50 extending around the central axis 52 of the inflator 10. The side wall 50 extends between a flat upper end wall 54 and a flat lower flange 56. An inner annular surface 55 on the upper end wall 54 of the diffuser cup 42 defines a central opening 57 in the upper end wall 54. The end wall 54 and the flange 56 are generally parallel to each other and perpendicular to the axis 52. An annular array of gas outlet openings 58 extends circumferentially around an upper portion of the diffuser cup side wall 50.

The combustion cup 44 is generally cup-shaped and is disposed inside the diffuser cup 42. The combustion cup 44 has a cylindrical side wall 60 extending around the axis 52. The cylindrical side wall 60 extends between a flat upper end wall 64 and a flat lower flange 66. The upper end wall 64 and the lower flange 66 ar generally parallel to each other and perpendicular to the axis 52. An annular array of openings 68 extends circumferentially around a lower portion of the combustion cup side wall 60.

The upper end wall 64 of the combustion cup 44 is welded with a continuous weld to the annular surface 55 on the upper end wall 54 of the diffuser cup 42 at a circumferential weld location 70, preferably by laser welding. The combustion cup flange 66 is welded with a continuous weld to the diffuser cup flange 56 at a circumferential weld location 72, also preferably by laser welding.

The combustion chamber cover 46 is a generally flat metal piece having a circular center portion 80 and a parallel but slightly offset annular outer flange 82. A circular opening 84 is located in the center portion 80 of the chamber cover 46. The outer flange 82 of the chamber cover 46 is welded with a continuous weld to the combustion cup flange 66 at a circumferential weld location 86, again preferably by laser welding A hermetically sealed canister 90 is disposed in the combustion cup 44. The canister 90 is made of two pieces, namely, a lower canister section 92 and a cover 94. The radially outer edge of the canister cover 94 is crimped to an adjacent edge of the canister lower section 92 to seal the canister 90 hermetically. The canister 90 is preferably made of relatively thin aluminum.

The canister lower section 92 has a cylindrical outer side wall 96 adjacent to and inside the combustion cup side wall 60. The side wall 96 has reduced thickness in the area adjacent the openings 68 in the combustion cup side wall 60. The canister lower section 92 also has a cylindrical inner side wall 98 spaced radially inward from the outer side wall 96. The side wall 98 has a reduced thickness in the area adjacent an igniter 142.

A flat ring-shaped lower wall 100 of the canister lower section 92 interconnects the outer side wall 96 and the inner side wall 98. A circular inner top wall 102 of the canister lower section 92 extends radially inward from and caps the inner side wall 98. The inner top wall 102 and the cylindrical inner side wall 98 define a downwardly opening central recess 104 in the canister 90.

The canister cover 94 is generally circular in shape. A recess 106 is located in the center of the canister cover 94. A packet 108 of auto ignition material is located in the recess 106 and held in the recess 106 by a piece of aluminum foil tap 109.

A plurality of annular disks 110 of gas generating material are stacked atop each other within the canister 90. An annular cushion 112 is disposed between the uppermost gas generating disk 114 and the inside of the canister cover 94. The disks 110 are made of a known material which, when ignited, generates nitrogen gas. Although many types of gas generating material could be used, suitable gas generating materials are disclosed in U.S. Pat. No. 3,895,098.

An annular prefilter 120 is disposed in the canister 90. The prefilter 120 is located radially outward of the gas generating disks 110 and radially inward of the outer side wall 96 of the canister 90. A small annular space exists between the prefilter 120 and the outer side wall 96.

An annular slag screen indicated schematically at 122 is located in the diffuser cup 42, outside of the combustion cup 44. The slag screen 122 is disposed radially outward of the openings 68 and in contact with the combustion cup side wall 60. However, the slag screen 122 could be spaced away from the openings 68 in the combustion cup side wall 60.

An annular final filter assembly indicated schematically at 124 is located inside the diffuser cut 42 above the slag screen 122. The final filter assembly 124 is radially inward of the gas outlet openings 58 in the side wall 50 of the diffuser cup 42. The final filter assembly 124 is a plurality of layers of various materials. The layers extend around the diffuser cup side wall 50 and are located inside the side wall. The detailed structure of the final filter assembly 124 does not form a part of the present invention and therefore will not be described in detail.

An annular filter shield 126 projects radially inwardly from the diffuser cup side wall 50 and separates the final filter assembly 124 and the slag screen 122. An annular graphite seal 128 seals the gap between the upper edge of the final filter assembly 124 and the inside of the diffuser cup upper end wall 54. Another annular graphite seal 130 seals the gap between the lower edge of the final filter assembly 124 and the upper side of the filter shield 126.

The inflator 10 includes an initiator assembly 140. The initiator assembly 140 projects through the opening 84 in the chamber cover 46 into the central recess 104 of the canister 90. The initiator assembly 140 is welded with a continuous weld, preferably a laser weld, to the center portion 80 of the chamber cover 46 at a circumferential weld location 144.

The initiator assembly 140 includes the igniter 142. The igniter 142 includes a pair of wire leads 146 which extend outwardly from the initiator assembly 140. The wire leads 146 are connectable to a collision sensor (not shown). The wire leads 146 are connected to a resistance wire embedded in an ignition material in the igniter 142. The igniter 142 may be of any suitable well known construction. A thin plastic film (not shown) is locate on the outside of the upper portion of the igniter 142, to prevent metal-to-metal contact which could ground the igniter 142 and disable the inflator 10.

Upon the occurrence of a collision or other sudden vehicle deceleration, the collision sensor closes an electrical circuit. An electrical current then flows through the wire leads 146 to the igniter 142. The resistance wire sets off the ignition material which ignites a charge in the igniter 142. Ignition of the charge forms hot gas products which flow outwardly from the igniter 142 and rupture the inner top wall 102 and the inner side wall 98 of the canister 90. The hot gas from the igniter 142 ignites the disks 110 of gas generating material. The disks 110 of gas generating material rapidly produce a large volume of another hot gas.

The pressure of the gas acts on the cylindrical side wall 96 of the canister 90, forcing the side wall 96 radially outwardly against the combustion cup side wall 60. This results in the thin side wall 96 of the canister 9 being ruptured or blown out at the openings 68 in the combustion cup side wall 60. The reduced thickness of the side wall 96 adjacent the openings 68 allows this portion of the side wall 96 to rupture in preference to other portions at a desired pressure. The gas generated by burning of the disks 110 then flows radially outwardly through the prefilter 120. The prefilter 120 removes from the flowing gas some combustion products of the initiator assembly 140 and of the gas generating disks 110. The prefilter 120 cools the flowing gas. When the gas cools, molten products such as metal are plated onto the prefilter 120. The gas flows through the openings 68 and into the slag screen 122.

The slag screen 122 removes and traps particles from the flowing gas. The slag screen also cools the flowing gas. When the gas cools, molten combustion products such as metal oxide are plated onto the slag screen 122. The filter shield 126 between the slag screen 122 and the final filter assembly 124 causes turbulent flow of gas to occur in and around the slag screen 122. The turbulent gas flow promotes the retention of relatively heavy particles in the slag screen 122 and in the lower portion of the diffuser cup 42.

The gas flows axially upwardly from the slag screen 122 to the final filter assembly 124. The gas then flows radially outwardly through the final filter assembly 124 which removes small particles from the gas. The final filter assembly 124 also further cools the gas so that molten products in the gas may deposit on parts of the final filter assembly 124. The annular array of gas outlet openings 58 directs the flow of ga into the air bag 12 to inflate the air bag 12.

In accordance with the present invention, the annular prefilter 120 is compressed axially between the canister cover 94 and the canister lower section 92 to hold the prefilter 120 in place in the canister 90. Thus, the prefilter is secured in place without requiring welding or radial loading of the canister side walls.

The canister lower wall 100 (FIG. 2) abuttingly engages the central portion 80 of the housing cover 46. The lower wall 100 has an inner surface 150 facing axially inwardly toward the canister cover 94. The canister outer side wall 96 includes an annular lower wall portion 152 (FIG. 3) extending axially upwardly inside the combustion cup side wall 60. An annular connector portion 154 extends axially upwardly and radially inwardly from the lower wall portion 152. A locator portion 156 of the outer side wall 96 extends axially upwardly from the connector portion 154. The locator portion 156 is smaller in diameter than the lower wall portion 152. An annular ring portion 158 projects radially outwardly from the upper end of the locator portion 156.

The canister cover 94 includes a circular central portion 160. A rigid annular rib portion 162 is U-shaped in section and is located radially outward of the central portion 160. The rib portion 162 has an inner wall 164 extending axially downwardly from the central portion 160. A curved bottom wall 166 of the rib portion 162 extends radially outwardly from the inner wall 164. The bottom wall 166 has an inner surface 168 which faces axially downwardly toward the bottom wall 100 of the canister 90. An outer wall 170 of the rib 162 extends axially upwardly from the bottom wall 166. An annular flange portion 172 projects radially outwardly from the outer wall 170 and includes a first ring portion 174 and a second ring portion 176.

The prefilter 120 (FIGS. 2 and 3) is annular in shape. The prefilter 120 has a cylindrical outer surface 180 spaced radially inwardly from the outer side wall 96 of the canister 90. The prefilter 120 has a cylindrical inner surface 182 spaced radially inwardly from the outer surface 180. The inner surface 182 is spaced radially outwardly from the disks 110 of gas generating material. An annular radially extending upper end face 184 connects the outer and inner surfaces 182 and 184 at the upper end of the prefilter 120. An annular radially extending lower end face 186 (FIG. 2) of the prefilter 120 connects the outer and inner surfaces 180 and 182 a the lower end of the prefilter 120.

The prefilter 120 is a knitted structure of one or more stainless steel wires. The knitted structure is compression formed to obtain the desired density. The wires become randomly oriented when the knitted structure is compression formed. The wires are knitted together so that only the longitudinal surfaces of the wires are exposed on the surfaces 180 and 182 and on the end faces 184 and 186 of the prefilter 120. Thus, there are a minimum number of wire ends on the outside of the prefilter 120, to avoid damaging the canister 90.

The knitted stainless steel material when compression formed into the annular shape of the prefilter 120 resiliently deforms under an axial load. The material of the prefilter 120 is preferably UNS S30100 stainless steel per the ASTM-A-580 standard, which can be obtained from Metex Corporation of New Jersey. Stainless steel structures with a range of 20%-40% density by volume are suitable. The stainless steel structure preferably has a 30% density by volume. That is, 30% of the volume defined by the surfaces 180 and 182 and the end faces 184 and 186 is filled with metal.

In assembly of the canister 90, the prefilter 120 is first inserted into the canister lower section 92. The relatively small diameter locator portion 156 of the outside side wall 96 helps to guide the prefilter 120 into the canister lower section 92. The lower end face 186 of the prefilter 120 engages the inner surface 150 of the lower wall 100 of the canister 90. The outer surface 180 of the prefilter 120 is spaced radially inwardly from the lower wall portion 152 of the canister side wall 96. The disks 110 of gas generating material are placed in the canister lower section 92 inside the prefilter 120.

Figure 4:
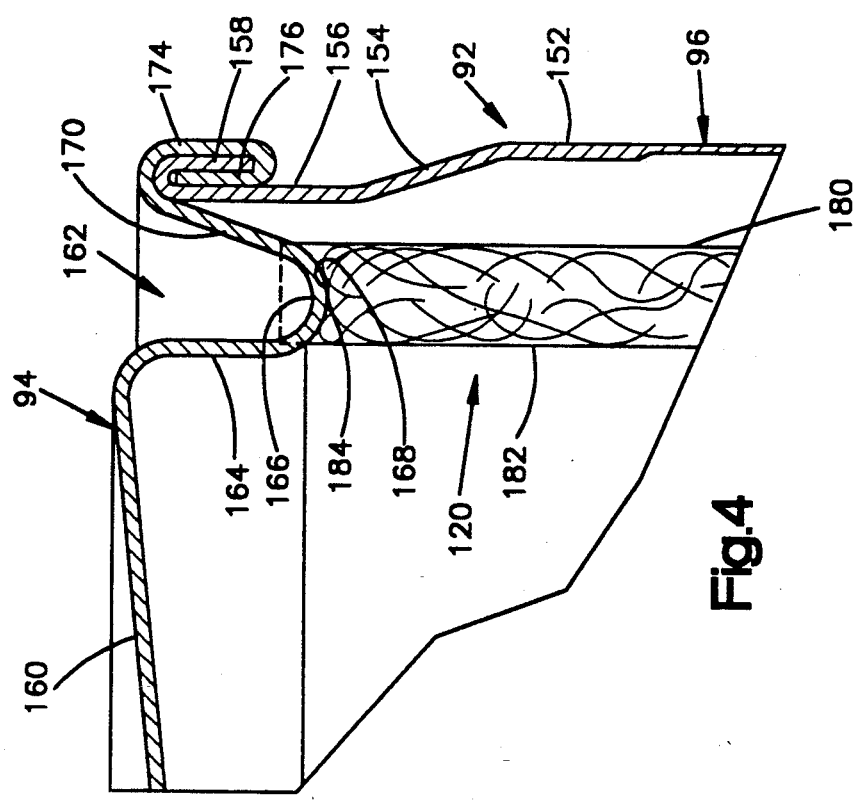
FIG. 4 is a view showing the parts of FIG. 3 in an assembled condition.
Figure 3:
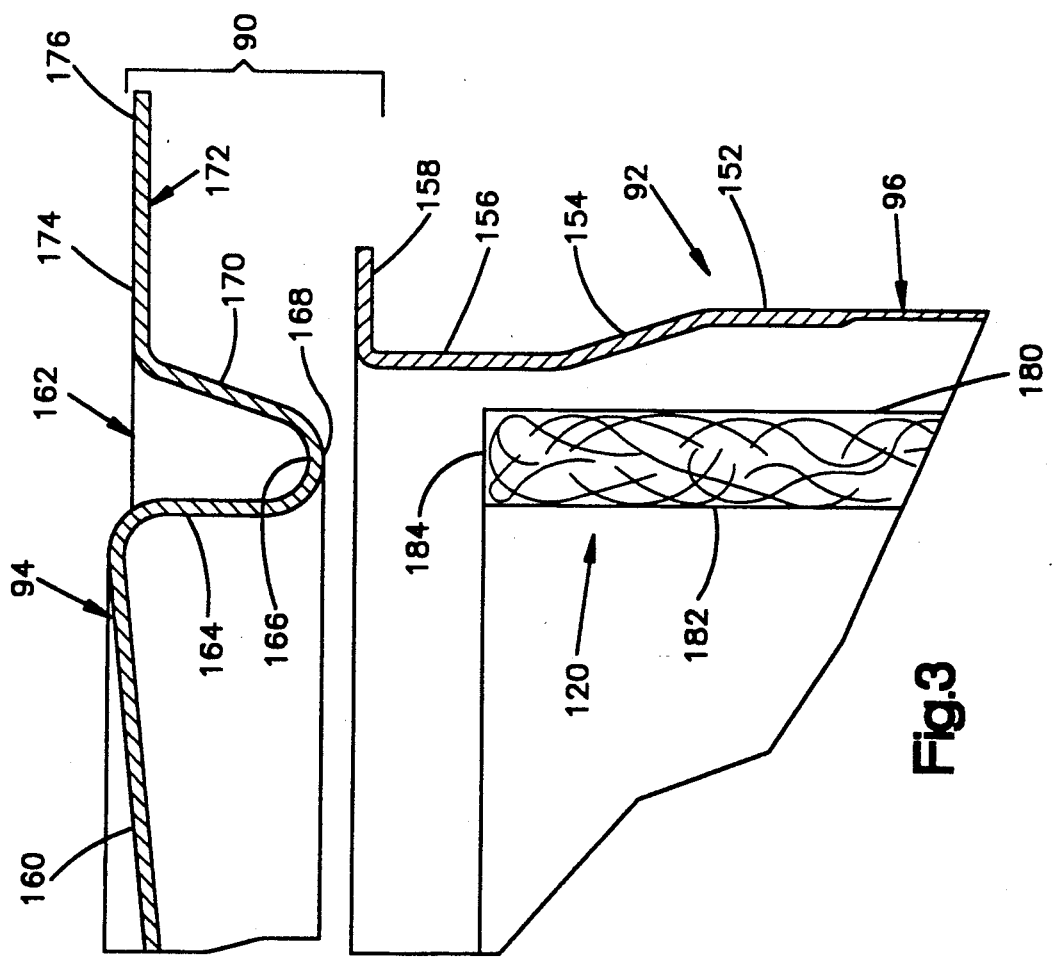
FIG. 3 is an enlarged schematic view of parts of the inflator of FIG. 1 in an unassembled condition.

The canister cover 94 is then positioned over the canister lower section 92 as shown in FIG. 3. The canister cover 94 and the canister lower section 92 are moved axially toward each other. The first ring portion 174 on the canister cover 94 engages the ring portion 158 on the canister lower section 92. The second ring portion 176 on the canister cover 94 is folded around and under the ring portion 158 of the canister lower section 92. The ring portions 158, 174 and 176 are bent downwardly to engage the locator portion 156 (FIG. 4), thus forming an annular seam joining the canister cover 94 to the canister lower section 92. The annular seam forms a hermetic seal.

With the parts 92 and 94 of the canister 90 in this position, the curved bottom wall 166 of the annular rib 162 is spaced from the lower wall 100 of the canister by a distance which is slightly less than the uncompressed height of the prefilter 120. Thus, when the canister cover 94 is assembled to the canister lower section 92 as described above, the inner surface 168 on the rib portion 162 engages the upper end face 184 of the prefilter 120. The prefilter 120 is thus trapped between the inner surface 168 on the rib portion 162 of the canister cover 94 and the inner surface 150 o the lower wall 100 of the canister lower section 92.

The canister cover 94 and the canister lower section 92 together apply an axial load on the prefilter 120. The rib portion 162 is more rigid than the prefilter 120, so the prefilter 120 is slightly compressed axially. For example, the prefilter 120, which may have an axial height of about 31 millimeters, may be compressed by amount 0.8 millimeters axially. The axial compressive load resiliently deforms the prefilter 120 and is sufficient to block radial and axial movement of the prefilter 120 in the canister 90. Thus, the prefilter 120 does not engage the lower wall portion 152 of the canister 90, and the prefilter 120 does not rattle in the canister 90. The axial compressive load does not permanently deform the prefilter 120.

From the above description of the invention, those skilled in the art will perceive improvements, changes and modifications in the invention. Such improvements, changes and modifications within the skill of the art are intended to be covered by the appended claims.

I claim:

1. Apparatus for inflating a vehicle occupant restraint comprising:
    a housing;
    a canister in said housing having first and second spaced apart opposed axially inwardly facing surfaces;

gas generating material within said canister which when ignited generates gas for inflating the vehicle occupant restraint; and a filter in said canister for filtering the gas generated by the gas generating material, said filter being compressed by said first and second opposed axially inwardly facing surfaces of said canister by an amount sufficient to hold said filter in place in said canister, said opposed axially inwardly facing surfaces being spaced form each other by a distance which is less than the uncompressed height of said filter.

2. Apparatus as defined in claim 1 wherein said canister includes a container portion in which said gas generating material is disposed and a cover, and wherein said first surface is a surface on said container portion and said second surface is a surface on said cover.

3. Apparatus as defined in claim 2 wherein said second surface comprises a surface on an axially inwardly projecting rib on said cover.

4. Apparatus as defined in claim 3 wherein said canister is hermetically sealed and has an outer annular wall, and said filter comprises an annular filter spaced radially outwardly of said gas generating material and radially inwardly of a cylindrical lower wall portion of said outer annular wall of said canister.

5. Apparatus as define din claim 4 wherein said rib comprises an annular rib on said canister cover, said annular filter having first and second opposed annular end faces, said annular rib engaging a linear first end face of said annular filter, said first surface engaging said second end face of said annular filter, said annular rib deforming said linear end face of said filter to a non-linear condition.

6. Apparatus as defined in claim 4 further comprising means for positioning said filter radially in said canister comprising a cylindrical locator portion of said outer annular wall of said canister which is smaller in diameter than said cylindrical lower wall portion of said outer annular wall of said canister.

7. Apparatus as defined in claim 4 wherein said filter comprises a knitted stainless steel structure of randomly oriented stainless steel wire.

8. Apparatus as defined in claim 7 wherein said knitted steel structure has a surface defined entirely by longitudinal surfaces of said wire.

9. Apparatus for inflating a vehicle occupant restraint comprising:

a housing;

a canister in said housing;

gas generating material within said canister which when ignited generates gas for inflating the vehicle occupant restraint; and a filter in said canister for filtering the gas generated by the gas generating material, said filter comprising a knitted stainless steel structure of randomly oriented stainless steel wire having a surface defined substantially entirely by distance which is less than the uncompressed height of said filter.

10. Apparatus as defined in claim 9 wherein said canister has an outer annular wall and a cover, said first surface comprises a surface on an annular axially inwardly projecting rib on said cover, and said filter comprises an annular filter spaced radially outwardly of said gas generating material and radially inwardly of a cylindrical lower wall portion of said outer annular wall of said canister, said annular filter having first and second opposed annular end faces, said annular rib engaging a first end face of said annular filter, said second surface of said canister engaging said second end face of said annular filter.

* * * * *

UNITED STATES PATENT AND TRADEMARK OFFICE
CERTIFICATE OF CORRECTION

PATENT NO. : 5,221,107
DATED : June 22, 1993
INVENTOR(S) : John P. O'Loughlin

It is certified that error appears in the above-indentified patent and that said Letters Patent is hereby corrected as shown below:

Column 7, line 10, change "form" to -- from --.

Column 7, line 27, change "define din" to -- defined in --.

Column 8, line 22, after "by" insert -- longitudinal surfaces of said wire;

said filter being compressed between first and second opposed axially inwardly facing surfaces of said canister to hold said filter in place in said canister, said opposed axially inwardly facing surfaces being spaced from each other by a --.

Signed and Sealed this

Twenty-second Day of February, 1994

Attest:

BRUCE LEHMAN

*Attesting Officer*        *Commissioner of Patents and Trademarks*